United States Patent
Kalabic et al.

(10) Patent No.: US 10,807,638 B2
(45) Date of Patent: Oct. 20, 2020

(54) METHODS AND SYSTEMS FOR BALANCED FEASIBLE AND STABLE CONTROL

(71) Applicant: Mitsubishi Electric Research Laboratories, Inc., Cambridge, MA (US)

(72) Inventors: Uros Kalabic, Jamaica Plain, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 65 days.

(21) Appl. No.: 15/939,530

(22) Filed: Mar. 29, 2018

(65) Prior Publication Data

US 2019/0300050 A1   Oct. 3, 2019

(51) Int. Cl.
| | | |
|---|---|---|
| *B60T 8/1755* | (2006.01) | |
| *B60T 8/172* | (2006.01) | |
| *B60T 7/04* | (2006.01) | |
| *B62D 6/00* | (2006.01) | |
| *B62D 5/04* | (2006.01) | |
| *B62D 6/02* | (2006.01) | |
| *B62D 6/08* | (2006.01) | |
| *B62D 15/02* | (2006.01) | |

(52) U.S. Cl.
CPC ............. *B62D 6/002* (2013.01); *B62D 5/046* (2013.01); *B62D 6/008* (2013.01); *B62D 6/02* (2013.01); *B62D 6/08* (2013.01); *B62D 15/025* (2013.01)

(58) Field of Classification Search
CPC .......... B62D 6/002; B62D 5/046; B62D 6/02; B62D 6/08
USPC ........................................................ 701/42
See application file for complete search history.

(56) References Cited

U.S. PATENT DOCUMENTS

| 7,004,278 B2 | 2/2006 | Sugitani et al. | |
|---|---|---|---|
| 2003/0135290 A1* | 7/2003 | Yao .................... | B60G 17/0182 700/50 |
| 2011/0307129 A1* | 12/2011 | Yu ....................... | B60L 15/2036 701/22 |
| 2012/0095621 A1* | 4/2012 | Zhu ..................... | G05D 1/0825 701/3 |
| 2012/0109620 A1* | 5/2012 | Gaikwad .............. | G05B 13/048 703/21 |
| 2013/0049671 A1* | 2/2013 | Shilpiekandula ...... | G05B 13/04 318/615 |
| 2013/0226412 A1* | 8/2013 | Kunihiro .............. | B62D 5/0463 701/42 |

(Continued)

FOREIGN PATENT DOCUMENTS

JP            4997558 B2      5/2001

*Primary Examiner* — Peter D Nolan
*Assistant Examiner* — Wae L Louie
(74) *Attorney, Agent, or Firm* — Gennadiy Vinkour; James McAleenan; Hironori Tsukamoto

(57) ABSTRACT

Systems and methods for a control system for controlling a machine including a first controller to generate a first control command according to an objective of control. A second controller to generate a control input as a combination of a second control command and a third control command. Wherein the second controller generates the second control command according to the objective of control, and generates the third control command using a product of a gain with a difference between the first control command and the second control command. A motor to control the machine according to the control input.

20 Claims, 17 Drawing Sheets

(56) References Cited

U.S. PATENT DOCUMENTS

| | | | |
|---|---|---|---|
| 2013/0229135 A1* | 9/2013 | Long | H02P 21/13 |
| | | | 318/400.34 |
| 2013/0231891 A1* | 9/2013 | Long | H02P 21/13 |
| | | | 702/145 |
| 2014/0188774 A1* | 7/2014 | George | G05B 23/0254 |
| | | | 706/46 |
| 2014/0207361 A1* | 7/2014 | Iemura | F02D 41/1403 |
| | | | 701/115 |
| 2015/0158528 A1* | 6/2015 | Moshchuk | B62D 15/0265 |
| | | | 701/41 |
| 2018/0009466 A1* | 1/2018 | Akatsuka | B62D 5/0463 |

\* cited by examiner

METHODS AND SYSTEMS FOR BALANCED FEASIBLE AND STABLE CONTROL

FIELD

The present disclosure relates generally to control applications, and more particularly to a method and apparatus for controlling dynamical systems subject to stability and feasibility requirements.

BACKGROUND

A conventional controller designed to control a machine needs to produce a feasible control and ensure stability of the machine-controller system. The feasibility of control requirement ensures that the control variables, such as a state of the machine, satisfy constraints or other requirements. Specifically, the feasible control places the control variables of the machine in a feasible region formed by the set of all possible points (sets of values of the controlled variables) that satisfy the system's constraints, potentially including inequalities, equalities, and integer constraints.

The requirement that the system be stability ensures that the machine controlled according to a desired control objective acts according to that objective. Various types of stability can be considered that correspond to equilibrium solutions of differential equations or difference equations describing dynamical systems. One type concerns the stability of solutions near a point of equilibrium. Specifically, if the solutions that start out near an equilibrium point stay near the equilibrium point forever, then the system is stable.

Typically, conventional controllers are designed to be stable. However, some conventional controllers are not always feasible due to, e.g., the difficulties in enforcing the constraints and/or changes in the constraint set. To that end, there is a need to adapt the stable controllers to ensure the feasibility of their control. One conventional approach to achieve that objective is by modifying the control law of the controller. However, the modifications of legacy conventional controllers are not always possible. Another conventional option is to modify the output of the controller. However, such a modification interferes with the control loop inter-connecting the controller and the machine and can destabilize the operation of the controller, i.e., make the system feasible, but not stable.

Another conventional approach is to modify the input to the controller to ensure that a legacy controller acting on the modified input produces feasible control. Such a modification is usually performed by reference governors. However, the usage of reference governors is not possible in some situations. One typical example of such a situation is when a human operator is involved in a control loop acting on a controlled system using desired control objective formed in his/her mind. Naturally, it is difficult to modify operators' desires in a way that guarantees feasibility.

A last-resort conventional option is to replace the controller altogether, but this option is also not available in some situations. For example, in case of semi-autonomous cars, the driver of a vehicle cannot be replaced, and while the driver can navigate the vehicle according to his/her wishes, i.e., the control of the driving system operated by the driver is stable, the unpredictability of the driver's operations may result in infeasible control commands leading to a crash of the vehicle.

Accordingly, there is a need for a system and a method that address the feasibility of a controller without a replacing the controller, modifying the operations of the controller, or modifying the inputs of the controller.

SUMMARY

The present disclosure relates to control applications, in particular, to methods and apparatuses for controlling dynamical systems subject to stability and feasibility requirements.

Some embodiments are based on the realization that when there is a need to address the feasibility of a controller without an option of replacing the controller, modifying the operations of the controller, and/or modifying the inputs of the controller. For example, such a controller can be detached from a control loop and have operations that can be duplicated with a different controller which can be modified, and/or otherwise tuned to achieve feasible control. Notably, detaching the controller from the control loop can be different from replacing the controller altogether. Because the detached controller can be unaware of its detachment and acts like the controller being in charge of the control. In case of a vehicle control, an example of a detached controller can be a steering wheel disconnected from the wheels of the vehicle, while leaving the driver under the impression that the driver controls the heading of the vehicle. Similarly, an example of replaced controller is the removal of the steering wheel altogether giving the driver (now passenger) no options, but to rely on the autonomous driving control of the vehicle.

Unfortunately, because the detached controller loses the connection with the controlled machine, the detached controller can become unstable, i.e., because the controller continues to control the machine, but the controlled machine does not react to its control commands since the machine is controlled by a duplicate controller.

At least one way to avoid such an instability can be to switch the control between the original controller and the duplicate controller. For example, when the driver acts prudently, i.e., provides inputs resulting in the feasible control, this approach would let the driver be in charge. However, when the driver acts recklessly, i.e., provides the inputs resulting in the unfeasible control, this approach would switch the control to the duplicate controller, such as an autonomous or semi-autonomous driving system.

Unfortunately, this switch control method can be difficult to implement. For example, it is difficult to predict future prudent or reckless behavior of the drivers. The drivers may have their own opinion on what is prudent or not, which can differ from the rules of the duplicate controller. In addition, it is costly to implement the switch control methods that needs multiple feedback and/or control loops. To that end, some embodiments are based on recognition that it is desired to merge the controls of the original and duplicate controllers into a single control loop in such a manner as to provide a balance of stability of the system and feasibility of the control.

When both controllers, i.e., the original and the duplicate controller, have the same objective of control, e.g., aim to control the same physical quantities of the controlled machine, such a merger can provide a combination of the stable control commands and feasible control commands. Such a combination can be visualized as a spectrum of control, wherein one end of the spectrum is a stable control, i.e., the original controller provides stable but potentially infeasible control, and the other end of the spectrum is the feasible control, i.e., the duplicate controller provides feasible, but potentially unstable control. To that end, some embodiments are based on understanding that there is a need for rules of combinations of control commands of the original and duplicate controllers that would act as a knob or a slider on this spectrum placing the merged control between the stable and the feasible ends of the control spectrum.

Some embodiments are based on realization that such a slider can be implemented using outputs of one controller, either original or duplicate controller, combined with a product of a gain with a difference between the control commands of the original and the duplicate controllers. The difference component of the slider naturally effects the combination of the feasible and stable controls. Indeed, when the difference is zero, the stable control of the original controller is the same as the feasible control of the duplicate controller, and thus both stable and feasible. In other words, the smaller the difference, the better the chance that the merged control is both stable and feasible.

The gain acting on the difference between the control commands of the original and the duplicate controllers acts as a slider placing different emphasis on the control commands generated by the original controller or the control commands generated by the duplicate controller. For example, if the gain is infinitely large, then the merged control is according to the original controller. When the gain is zero, then the merged control is according to the duplicate controller. Other values of the gain balance the outputs of the original and the duplicate controllers.

Some embodiments of the present disclosure include balancing feasibility with stability of control by detaching the controller from control loop, and duplicating its operation with different, but feasible controllers having the same objective. This is realized by a product of a gain with a difference between the first control command and the second control command. The balance and stability can be currently determined using a model of the driver behavior, which this could potentially be learned in the future. At least one unique and novel aspect of the present disclosure, among many aspects, is the combination through a product of the gain with a difference.

Accordingly, some embodiments disclose a control system for controlling a machine. The control system includes a first controller to generate a first control command according to an objective of control; a second controller to generate a control input as a combination of a second control command and a third control command, wherein the controller generates the second control command according to the objective of control, and generates the third control command using a product of a gain with a difference between the first control command and the second control command; and a motor to control the machine according to the control input.

According to an embodiment of the present disclosure, a control system for controlling a machine. The control system can include a first controller to generate a first control command according to an objective of control. A second controller to generate a control input as a combination of a second control command, and a third control command. Wherein the controller can generate the second control command according to the objective of control, and can generate the third control command using a product of a gain with a difference between the first control command and the second control command. Finally, a motor can be used to control the machine according to the control input.

According to another embodiment of the present disclosure, a control system for controlling a machine including a first controller to generate a first control command according to an objective of control of an operator of the machine. A second controller to generate a control input as a combination of a second control command and a third control command. Wherein the controller generates the second control command according to an estimation of the objective of control, and generates the third control command using a product of a gain with a difference between the first and the second control commands. A motor to control the machine according to the control input.

According to another embodiment of the present disclosure, a control system for controlling a machine. The control system including a first controller to generate a first control command according to an objective of control. Wherein the objective of control is an objective of an operator of the machine. Such that the first controller accepts inputs from the operator to generate the first control command according to the objective of control. A second controller to generate a control input as a combination of a second control command and a third control command. Wherein the controller generates the second control command according to an estimation of the objective of control, and generates the third control command using a product of a gain with a difference between the first control command and the second control command. A motor to control the machine according to the control input.

According to another embodiment of the present disclosure, a method for controlling a movement of a vehicle. The method uses a processor coupled with stored instructions implementing the method, such that the instructions, when executed by the processor carry out at least some steps of the method. The method including receiving a signal indicative of a steering angle of a steering wheel of the vehicle. Mapping the received signal to a desired heading of the vehicle using a mapper based on internal states of the vehicle. Receiving vehicle data via a sensor, such that the vehicle data includes a measure of a current heading of the vehicle. Controlling the movement of the vehicle using a replicate controller, for causing the current heading of the vehicle to track the desired heading of the vehicle. Wherein the replicate controller generates a control input as a combination of a first replicate control command and a second replicate control command. Wherein the replicate controller generates the first replicate control command according to the desired heading of the vehicle, and generates the second replicate control command using a product of a gain with a difference between a nominal control command and the first replicate control command. Wherein the nominal control command is generated by a nominal controller based on an input from an operator of the vehicle.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

The present disclosure relates to control applications, in particular, to methods and apparatuses for controlling dynamical systems subject to stability and feasibility requirements.

Some embodiments of the present disclosure include a control system for controlling a machine. The control system can include a first controller to generate a first control command according to an objective of control. A second controller to generate a control input as a combination of a second control command, and a third control command. Wherein the controller can generate the second control command according to the objective of control, and can generate the third control command using a product of a gain with a difference between the first control command and the second control command. Finally, a motor can be used to control the machine according to the control input.

Figure 1A:
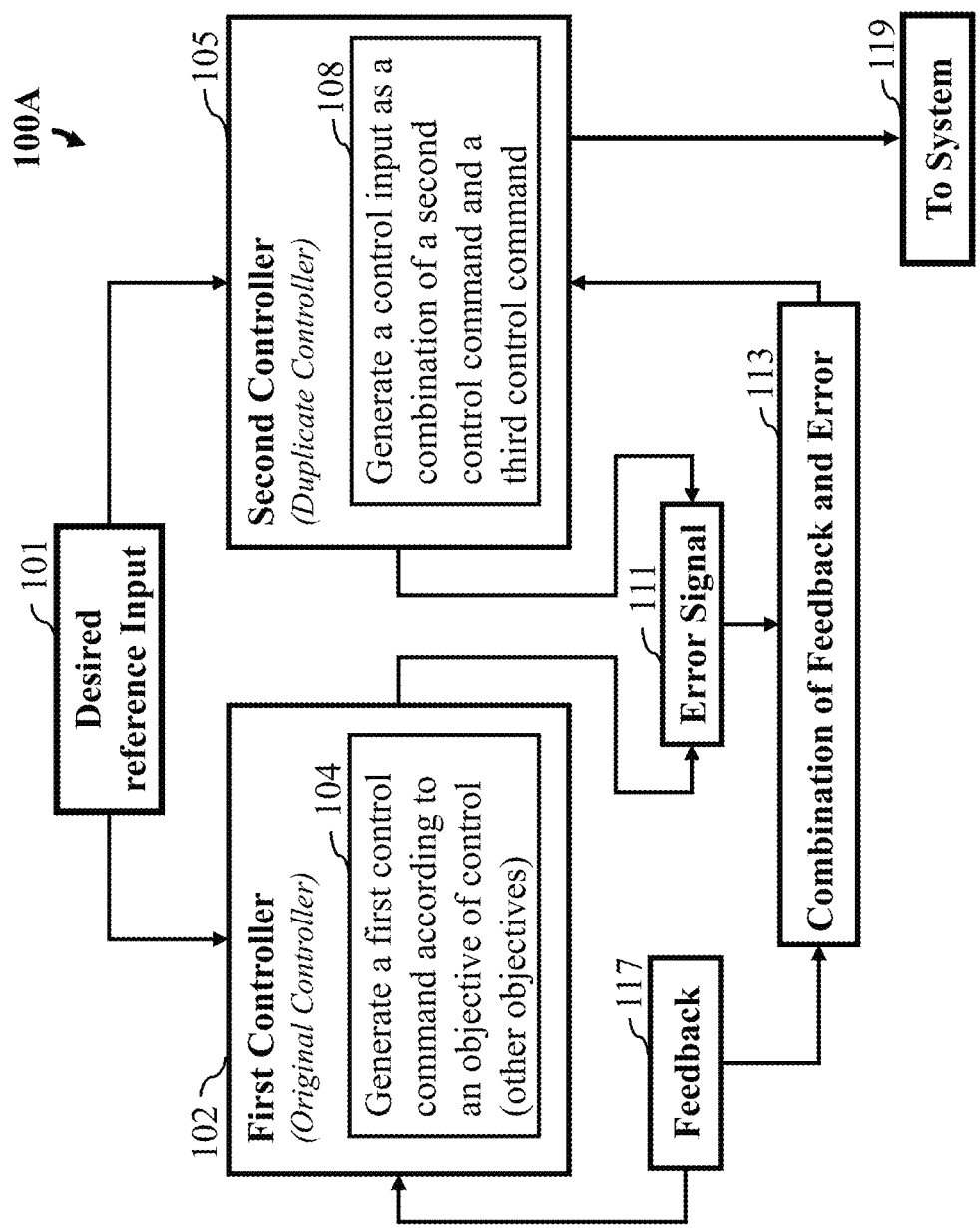
FIG. 1A is a flow diagram illustrating a control system for controlling a machine, according to embodiments of the present disclosure.

FIG. 1A is a flow diagram illustrating a control system for controlling a machine, according to embodiments of the present disclosure. A desired reference input 101, which is an objective expected to be achieved by the system, e.g., a vehicle heading for a vehicle system, is passed to a first controller 102 and a second controller 105. The first controller 102 is an operator or a legacy controller that should not be replaced. The first controller 102 can determine a command based on the feedback 117 received from the system, the reference input 101, and other objectives 104, such as comfort objectives, safety objective, etc. The second controller 105 can be a duplicate of the first controller 102. The second controller 105 can determine a command based on a combination of feedback and error 113 received from the system, the reference input 101, and other objectives 108 of the second controller 105, which may differ from the objectives 104 of the first controller. The error signal 111 is the difference between the commands sent by the first controller and the second controller. The combination 113 of error 111 and feedback 117 signals is determined so that the operation of the first and second controllers 102, 105 in tandem with the system 119 is stable. The combination is chosen according to a gain, shown in FIG. 1C and described in the following.

Figure 1B:
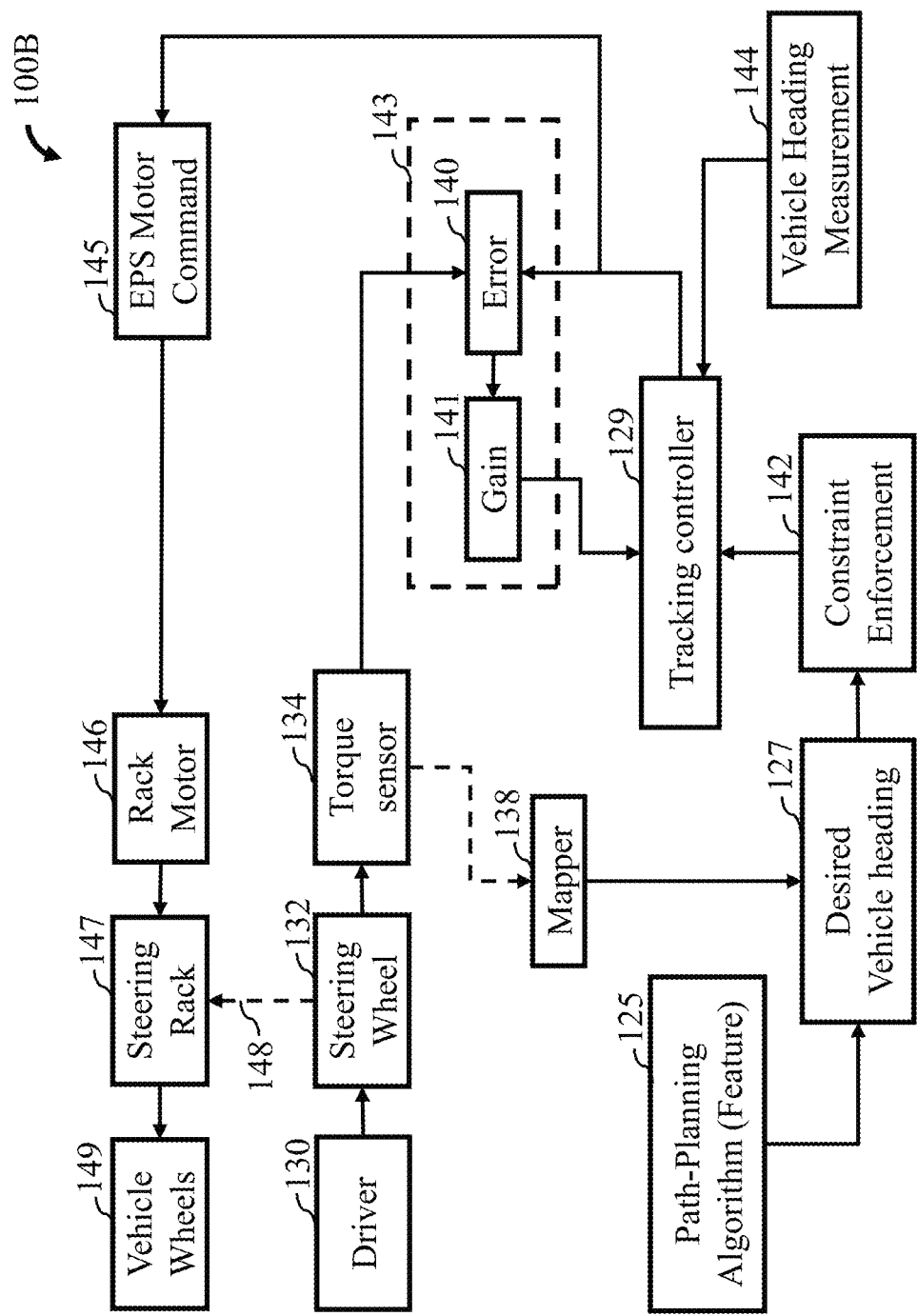
FIG. 1B is a block diagram of some flow process steps of the method of FIG. 1A, that further provides features including the inner control architecture, according to embodiments of the present disclosure.

FIG. 1B is a block diagram of some flow process steps of the method of FIG. 1A applied to a semi-autonomous automotive vehicle, that further provides features according to embodiments of the present disclosure. A path-planning algorithm or feature 125 determines a desired vehicle heading 127. The desired vehicle heading 127 is assumed to be close to the driver's internally-known heading. Although the driver's desired heading cannot be fully known because it is in the driver's head, it can be estimated based on road information provided by the path-planner 125 and driver behavior learned over time. In particular, this can be done by using a mapper 138 to map the driver's input, which is measured by the torque sensor 134, and other environmental knowledge, to a desired vehicle heading 127. The desired heading 127 is passed to a constraint enforcement scheme 142 called the reference governor.

The reference governor determines a safe heading based on constraints or other objectives deemed important by the designer. The constraint-admissible, modified heading is passed to a tracking controller 129, which determines an EPS torque command 145 based on the objective of following the modified desired heading 142, i.e., bringing the measured vehicle heading 144 as close as possible to the modified desired heading 142, and making sure that overall system operation, i.e., the entire system 100B, is stable. Stability is achieved by comparing the outputs of the tracking controller 129 and the driver's torque, measured by the torque sensor 134 in the steering wheel 132; this is called the error 140. The error 140 is multiplied by a gain 141, which is modified to ensure stability of the overall system 100B. In this way, a feasible EPS motor command 145 is generated. The constraint enforcement scheme 142 ensures that the motor command is constraint-admissible and the gain 141 ensures that it allows for stable operation of the overall system 100B. The EPS command is sent to the rack motor 146, which actuates the steering rack 147, which actuates the vehicle wheels 149. Note that in automotive vehicles there is often a mechanical coupling between the steering wheel 132, actuated by the driver 130, and the steering rack 147. When there is no mechanical coupling, this system is called a steer-by-wire system.

Figure 1C:
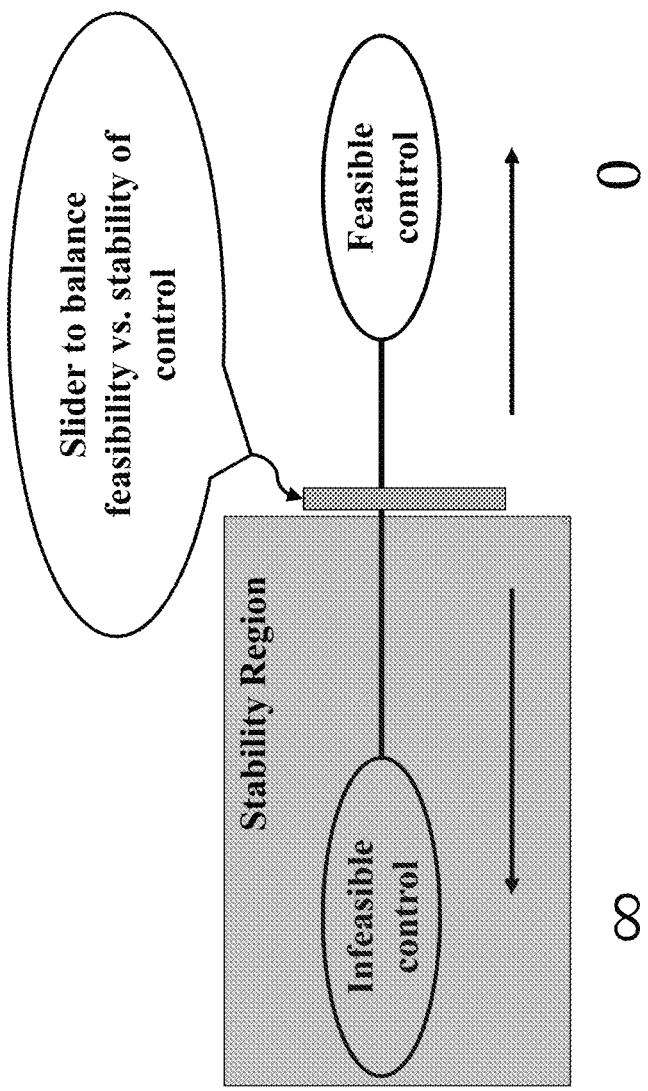
FIG. 1C is a schematic illustrating conceptually an overview of the control system, describing a slider that can be implemented using outputs of one controller (nominal controller) combined with a product of a gain with a difference between the control commands of nominal and replicate controllers, according to embodiments of the present disclosure.

FIG. 1C is a schematic illustrating a conceptual overview of the control system, describing a slider that can be implemented using outputs of one controller (nominal controller) combined with a product of a gain with a difference between the control commands of nominal and replicate controllers, according to embodiments of the present disclosure. Typically, the aim of the replicate controller is to ensure feasibility according to system objectives. Therefore, if the gain on the error is set to zero, the system operation is feasible. Although system operation may be feasible according to objectives. It does not mean that overall system operation is stable. For overall stability, the driver or first controller must be content and stable. For example, a gain of zero puts all weight on the second controller input; this fully ensures feasibility of the system operation but ignores driver input, leading to an uncontent driver and therefore an overall unstable system.

For example, a gain of infinity puts all weight on the first controller input; this fully ensures system stability because the first controller always ensures overall system stability, e.g., the driver is always content when he or she is in full control, but it does not ensure system feasibility. A combination of the two provides a balance between feasibility and stability of control. The value of the gain acting on the difference balances a preference of different controllers. The gain is determined so that the slider is to the rightmost of the stability region, which is a contiguous region spanning from a gain value of infinity to a non-negative gain value. The stability region can be determined according to an estimation algorithm which measures the first controller behavior and forms a model, and then compares the duplicate model's closeness to the estimated model, determining a region in which a gain would ensure overall system stability.

Figure 1D:
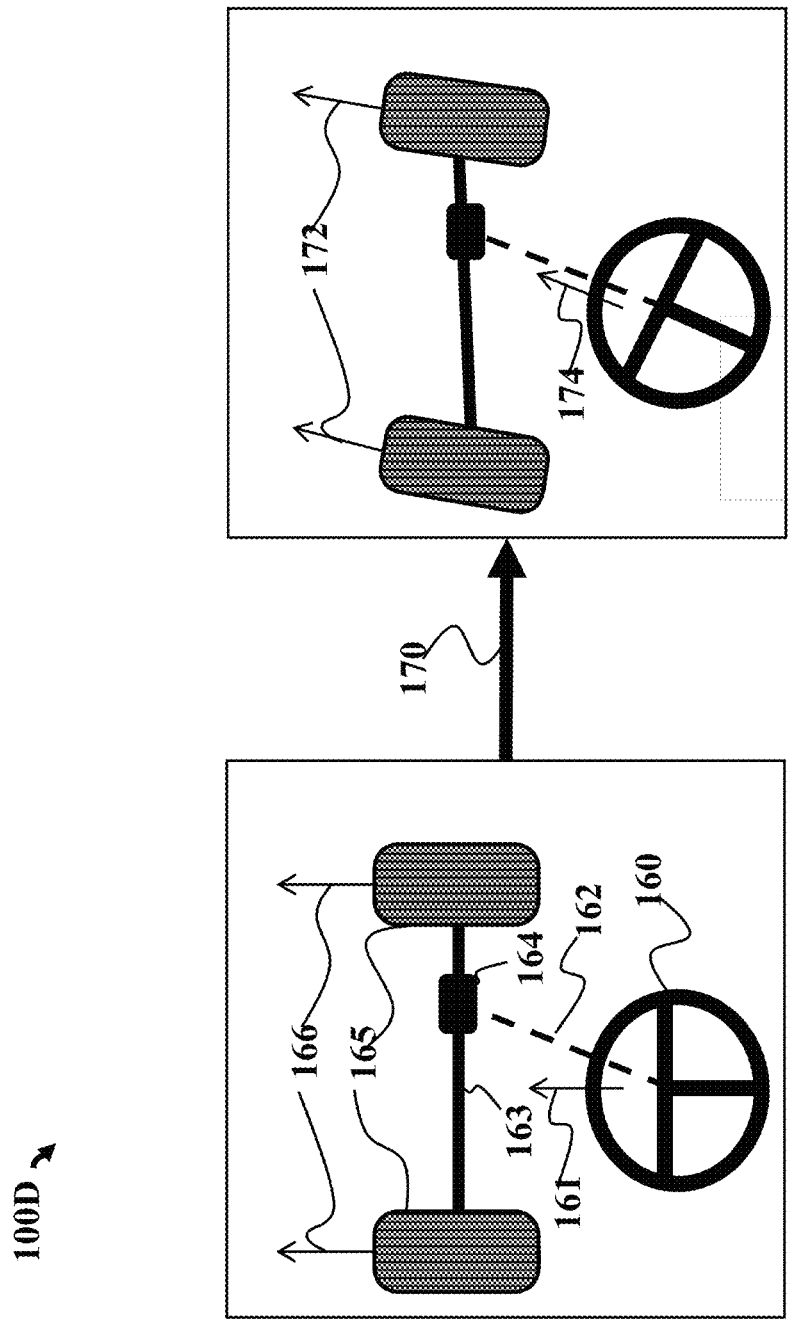
FIG. 1D a schematic of a physical steering system, according to embodiments of the present disclosure.

FIG. 1D a schematic of a physical steering system, according to embodiments of the present disclosure. The physical steering system 100D can include the driver actuating a steering wheel 160 to a certain direction 161. The steering wheel can be connected to the wheels via a steering column 162, in which case the driver actuates the vehicle wheels. In the case that the steering column 162 is not present, an electrical system comprised of sensors and motors mimics the behavior of a steering column; this type of configuration is called steer-by-wire. The steering column 162 and shaft 163 connecting the vehicle wheels 165 is actuated by a rack motor 164. The rack motor actuates the steering wheel to change the direction 172 of the vehicle wheels. At the same time, the direction 174 of the steering is changed, since the steering wheel shaft is actuated so that the direction of the wheels corresponds to the direction of the steering wheel.

Learned from experimentation is that a method can be designed for autonomously operated vehicles having steering control systems. The steering control system can include a desired heading that is passed to a tracking controller, which passes a signal to an Electronic Power Steering (EPS) motor to ensure tracking of the desired heading. Further, a reference governor-type approach can be used in the case of autonomous operation, since autonomous operation tracks a desired reference signal. Specifically, the reference governor, can be an add-on scheme applied to tracking controllers solely as a constraint-enforcement scheme, which determines a reference input for the tracking controller that can be deemed to be constraint admissible.

Further learned from experimentation is that a method can be designed for manually operated vehicles that have steering control systems. For example, the steering control system can measure the torque at the steering wheel which can be amplified using an amplifier, which passes a signal to the EPS motor in order to provide helping torque to the driver.

However, also learned from the above experimented steering control systems is that they both are fundamentally different from the embodiments of the present disclosure. For example, when we compared the two experimental steering control system to the embodiments of the present disclosure, we realized at least one problem, among many problems. That is, to enforce constraints in a semi-autonomous vehicle, i.e., where an autonomous system helps the driver, it may be necessary to ignore the driver input. Ignoring the driver input is unacceptable as the driver must always be fully in control of the vehicle. When the driver is not included in the control loop, the driver becomes decoupled from the operation of the vehicle, which leads to instability in the driver, e.g., the driver erratically moves the steering wheel while the vehicle steers according to the objectives of the autonomous system. Therefore, ensuring stability of the overall system, which includes the vehicle, the driver and the autonomous system, simultaneously ensures that the driver has control of the vehicle.

A balance must be achieved between the requirement that the driver have control and that constraints are enforced. If the driver is driving in such a way that constraints are enforced, the vehicle controller does not need to take action to modify the driver's path. If the driver is driving in such a way that constraints are not enforced, the vehicle controller can take action only up to the point where stability is guaranteed.

Figure 2:
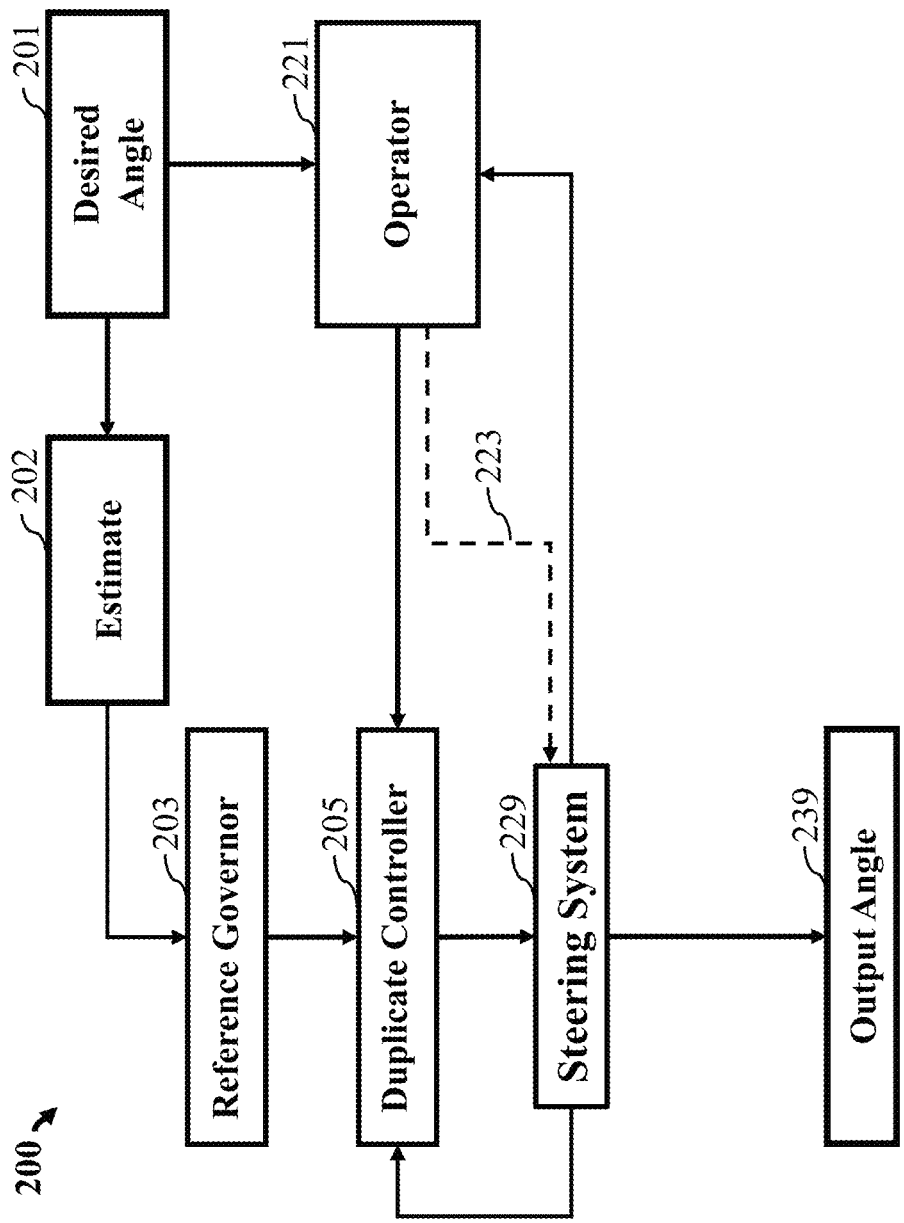
FIG. 2 is a block diagram illustrating a control system for controlling a machine, including a reference governor, a first controller, a duplicate controller and a steering system, according to embodiments of the present disclosure.

FIG. 2 is a block diagram illustrating a control system for controlling a vehicle, including a reference governor, a first controller, a duplicate controller and a steering system, according to embodiments of the present disclosure. A desired angle 201 is passed to a first controller 221, which is a human operator. At the same time, an estimate of the desired angle 202 is passed to a reference governor 203 which determines a safe, or constraint-admissible angle which is passed to a duplicate controller 205, which is a duplicate of the first controller 221. The duplicate and first controllers receive feedback from the steering system 229 and the duplicate controller sends a control command to the steering system 239 according to a desired input from the first controller and desired control objectives. In cases where there exists a mechanical coupling between steering wheel and steering system, the operator directly actuates the steering system 239 via the mechanical connection 223.

Figure 3A:
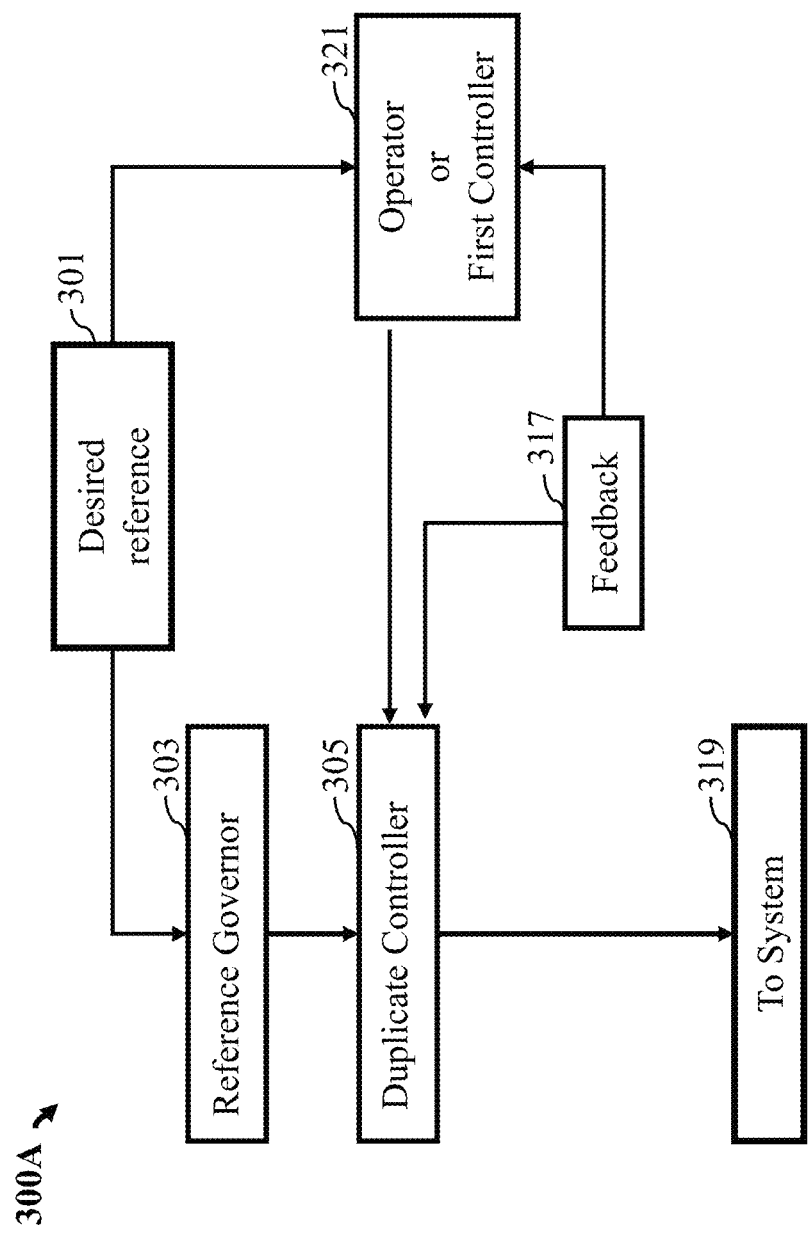
FIG. 3A is a block diagram illustrating a control system for controlling a machine, including a reference governor, a first controller, a duplicate controller and a feedback component, according to embodiments of the present disclosure.

FIG. 3A is a block diagram illustrating a control system for controlling a machine, including a reference governor, a first controller, a duplicate controller and a feedback component, according to embodiments of the present disclosure. A desired reference 301 is passed to a first controller 321, which may be a human operator. At the same time, the same reference or its estimate is passed to a reference governor 303 which determines a safe, or constraint-admissible angle which is passed to a duplicate controller 305, which is a duplicate of the first controller 321. The duplicate and first controllers receive feedback signal from the system to be controlled 317 and the duplicate controller sends a control command to the system 319 according to a desired input from the first controller and desired control objectives.

Figure 3B:
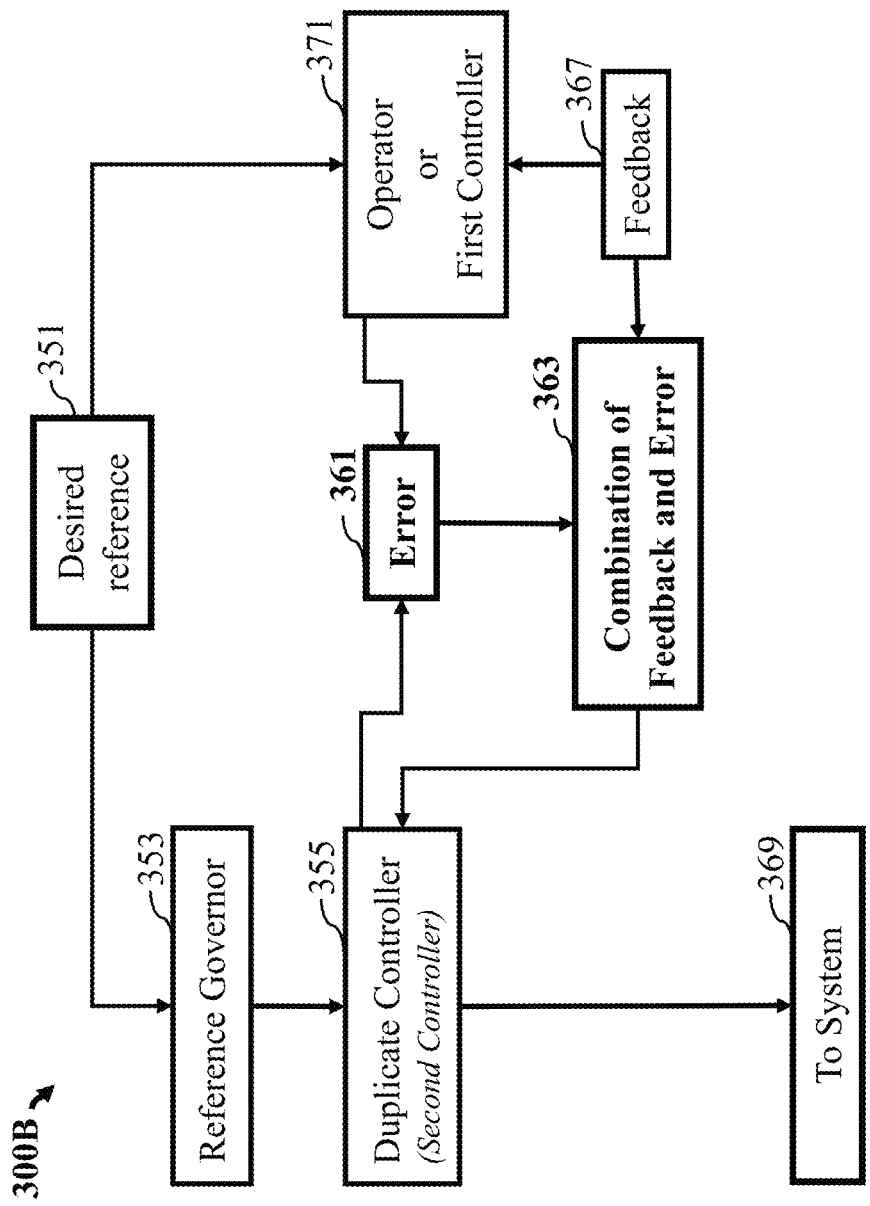
FIG. 3B is a block diagram illustrating a control system for controlling a machine, including a reference governor, a first controller, a duplicate controller, a feedback component, and an error computation, according to embodiments of the present disclosure.

FIG. 3B is a block diagram illustrating a control system for controlling a machine, including a reference governor, a first controller, a duplicate controller, a feedback component, and an error computation, according to embodiments of the present disclosure. A desired reference 351 is passed to a first controller 371, which may be a human operator. At the same time, the same reference or its estimate is passed to a reference governor 353 which determines a safe, or constraint-admissible angle which is passed to a duplicate controller 355, which is a duplicate of the first controller 371. The duplicate and first controllers receive feedback signal from the system to be controlled 367 and the duplicate controller sends a control command to the system 369. The duplicate controller determines the control command according to desired control objectives and a combination of an error signal and a feedback signal 363. The error signal 361 is the difference between the commands of the first and second controllers. The combination is determined so that the overall system operation is stable. This means that the interconnection between the first controller 371, duplicate controller 355 and system 369 is stable.

Figure 4:
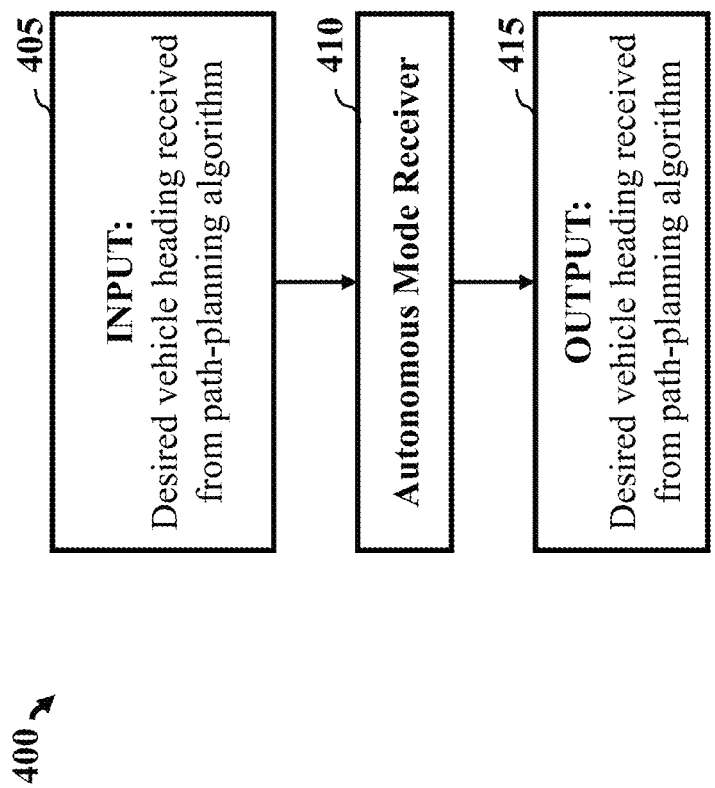
FIG. 4 is a block diagram illustrating the autonomous mode receiver of FIG. 1B, according to embodiments of the present disclosure.

FIG. 4 is a block diagram illustrating the autonomous mode receiver (i.e., 127 of FIG. 1B), according to embodiments of the present disclosure. The autonomous mode receiver can include the method 400, wherein the desired heading of the vehicle 405 can be received from a path-planning scheme and can be directly passed through to the autonomous mode receiver 410, and outputted as the desired vehicle heading received from the path-planning algorithm 415.

Figure 5:
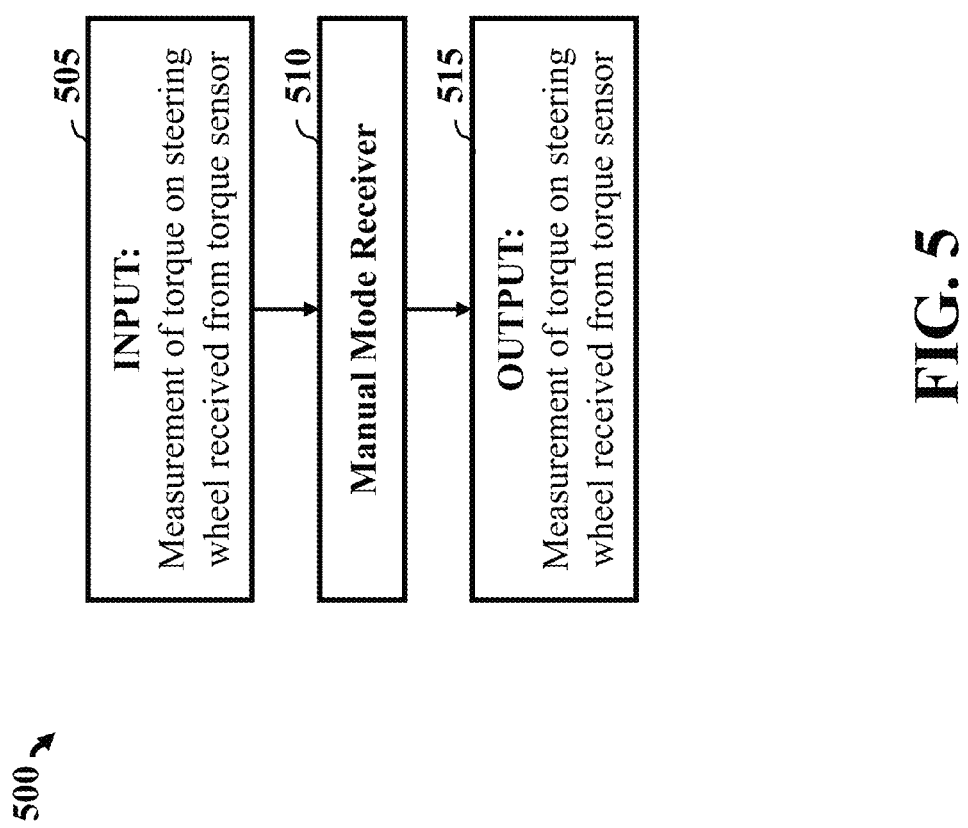
FIG. 5 is a block diagram illustrating the manual mode receiver of FIG. 1B, according to embodiments of the present disclosure.

FIG. 5 is a block diagram illustrating the manual mode receiver 134 of FIG. 1B, according to embodiments of the present disclosure. The manual mode receiver can include the method 500, wherein the input, the torque signal 505 can be received from a sensor attached to the steering wheel and can be directly passed through to the manual mode receiver 510, and outputted as a measurement of torque on the steering wheel received from the torque sensor 515.

Figure 6:
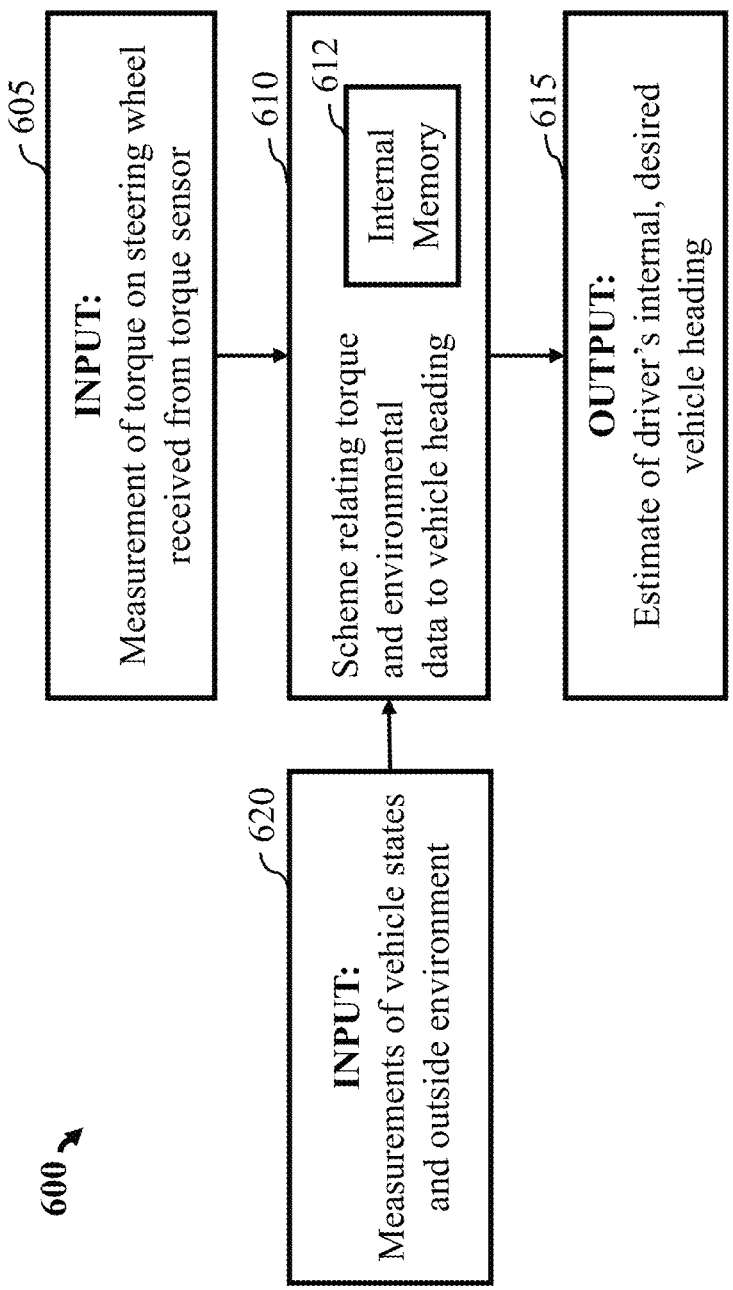
FIG. 6 is a block diagram illustrating the mapper of FIG. 1B, according to embodiments of the present disclosure.

FIG. 6 is a block diagram illustrating the mapper 138 of FIG. 1B, according to embodiments of the present disclosure. The mapper can include the method 600, wherein the mapper receives the steering wheel torque signal 605 along with additional information about the state of the vehicle and its surrounding environment 620. The mapper can have an internal memory 612 along with a programmed scheme 610 which can be used to estimate the driver's desired vehicle heading 615. The scheme itself can be a pre-programmed map, determined through the experience of a calibration engineer, which is at least one way to estimate desired headings from an available torque sensor and from environmental data. Furthermore, the scheme can be a sophisticated learning algorithm, which modifies itself based on the behavior of the driver through driving of the vehicle.

As a non-limiting example of how the vehicle heading can be determined from the driver's torque on the steering wheel, the mapper may determine the heading from the measured torque along with vehicle states that signify the type of maneuver that the driver may be attempting to perform with the torque with which he is actuating the steering wheel. These states may include, and are not limited to, the position of the vehicle, the speed of the vehicle, the current vehicle heading, the instantaneous directions of the vehicle wheels, the planned path of the vehicle, the weather conditions on the road, and the driver's state of mind as determined by, for example, an in-car mood recognition system. Furthermore, the states may be directly measured or indirectly estimated from vehicle data. As a more specific, non-limiting example of how the vehicle heading can be determined from the driver's torque on the steering wheel, the driver can be modeled as a control system whose input is a desired heading and output is a steering wheel torque and which depends on the states of the vehicle; the inverse of this model can be used as a map from the steering wheel torque and other vehicle states to the desired heading.

The mapper is not necessarily limited to mapping the steering input to the vehicle heading. In another embodiment, the mapper maps the steering input to the desired steering wheel angle; this is preferred when there is no environmental data available to the mapper. The steering angle can be used in the same way as the vehicle heading, i.e., it can be the output of a path-planning algorithm and a tracking controller can be designed to track a desired steering input.

Figure 7:
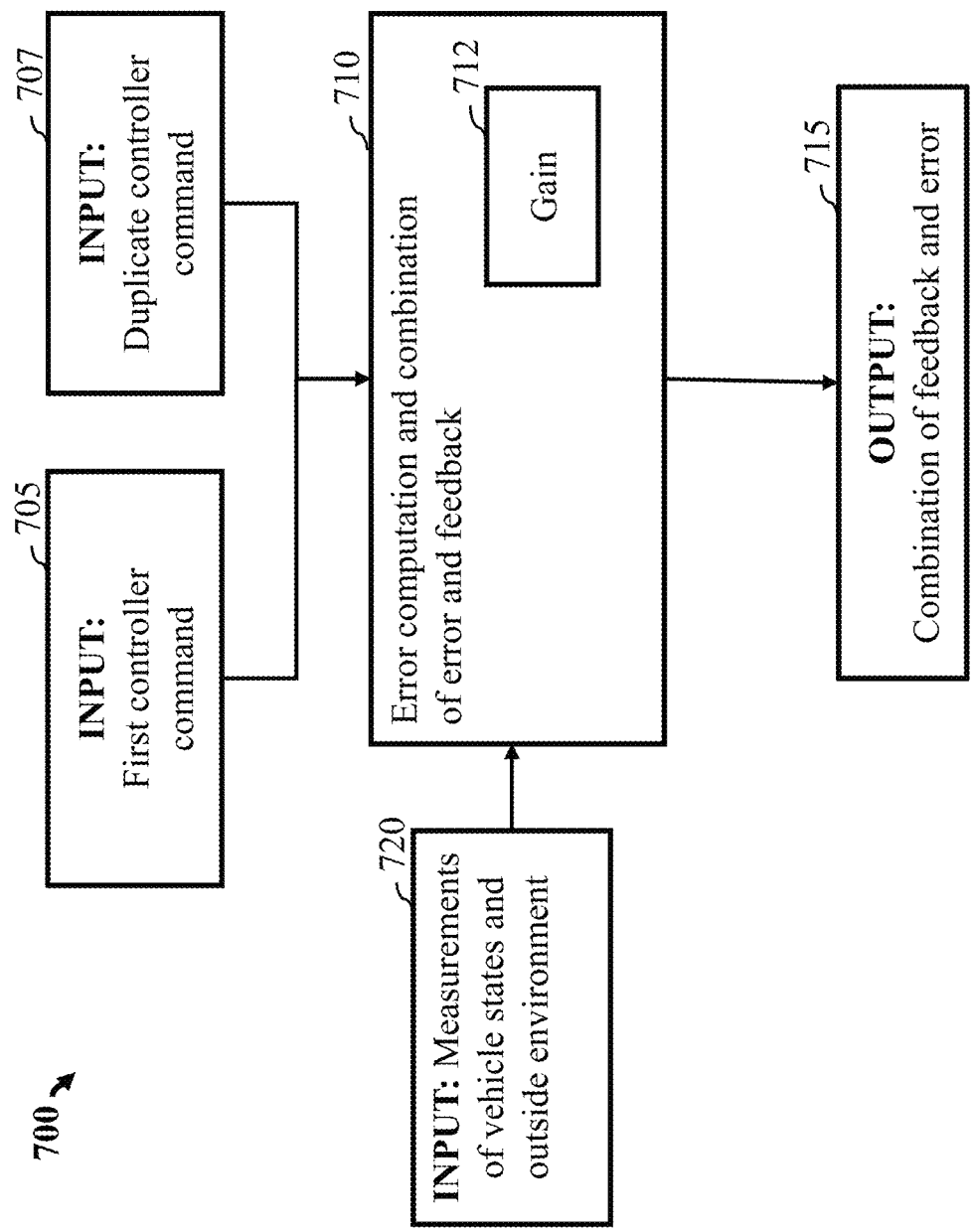
FIG. 7 is a block diagram illustrating the error and feedback combination of FIG. 1B, according to embodiments of the present disclosure.

FIG. 7 is a block diagram illustrating the error computation and combination of error and feedback 143 of FIG. 1B, according to embodiments of the present disclosure. The combination can include the method 700, wherein the combination receives a first controller command 705 and a duplicate controller command 707 and feedback measurements 720. The combination outputs a combination of these two signals 715 based on the value of a gain 712; the gain is proportional to the amount of weight placed on the first controller in the combination between feedback 720 and error.

Figure 8:
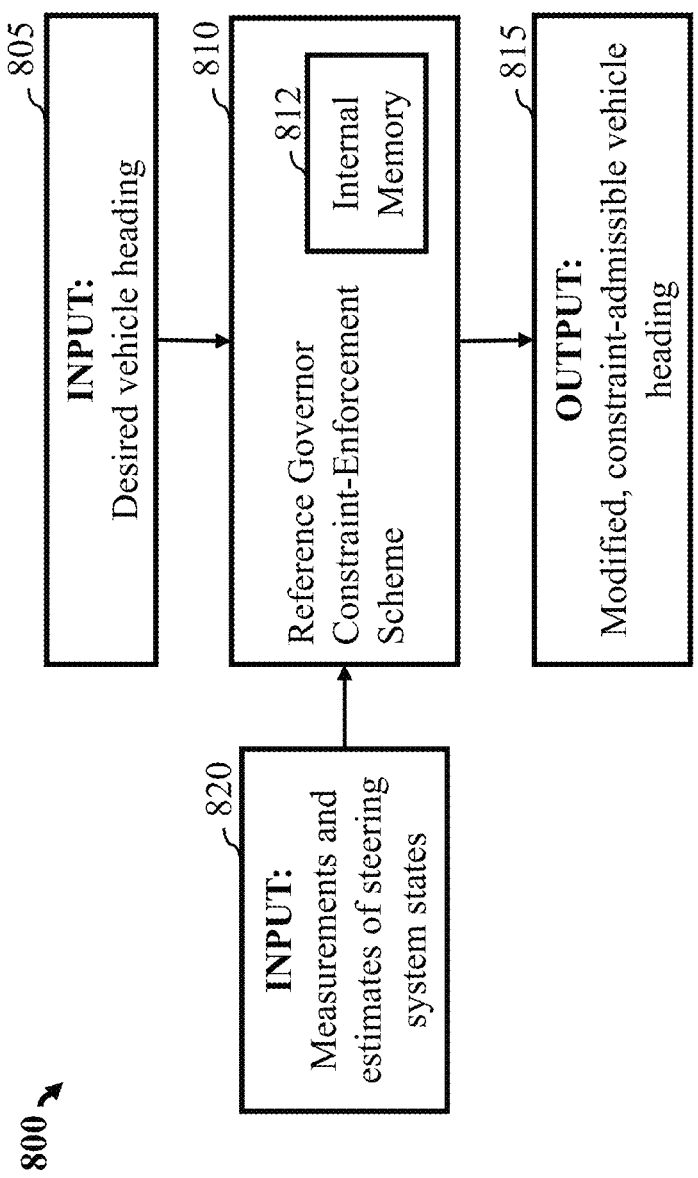
FIG. 8 is a block diagram illustrating the constraint-enforcement scheme of FIG. 1B, according to embodiments of the present disclosure.

FIG. 8 is a block diagram illustrating the constraint-enforcement scheme 142 of FIG. 1B, according to embodiments of the present disclosure. As noted above, the constraint-enforcement scheme can include the method 800, wherein the scheme itself can be called a reference governor, which is a constraint-enforcement scheme, designed to be added on to feedback controllers that have been designed without taking constraints into account. The reference governor 810 receives the desired vehicle heading 805 and modifies it to a constraint-admissible vehicle heading 815. This is done by comparing the reference input, i.e., the desired to vehicle heading 805, and the current state of the steering wheel system 820 to a set of safe reference-input/current-state pairs stored in internal memory 812. If the reference input is deemed unsafe, the closest reference input that can be deemed safe is chosen and passed as the modified reference input 815.

Figure 9A:
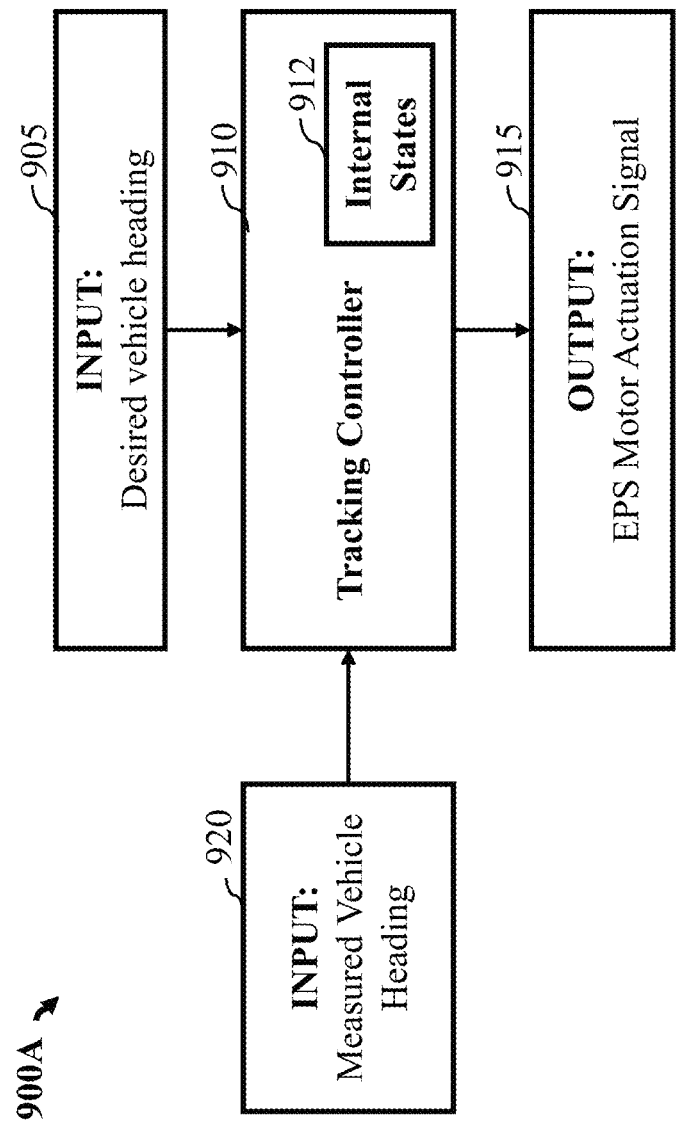
FIGS. 9A and 9B are block diagrams illustrating the feedback controller of FIG. 1B, which can be designed as a tracking controller, according to embodiments of the present disclosure.

FIG. 9A is a block diagram illustrating the tracking controller 129 of FIG. 1B, can be designed as a tracking controller, according to embodiments of the present disclosure. The feedback controller/tracking controller can include the method 900, wherein the tracking controller 910 receives both the desired vehicle heading 905 and the current, measured vehicle heading 920, measurements or estimates of steering system states and its own controller states 912. The tracking controller is designed to use this information to determine an actuator signal 915 for the EPS motor, which ensures that the measured heading 920 asymptotically approaches the desired heading 905.

Figure 9B:
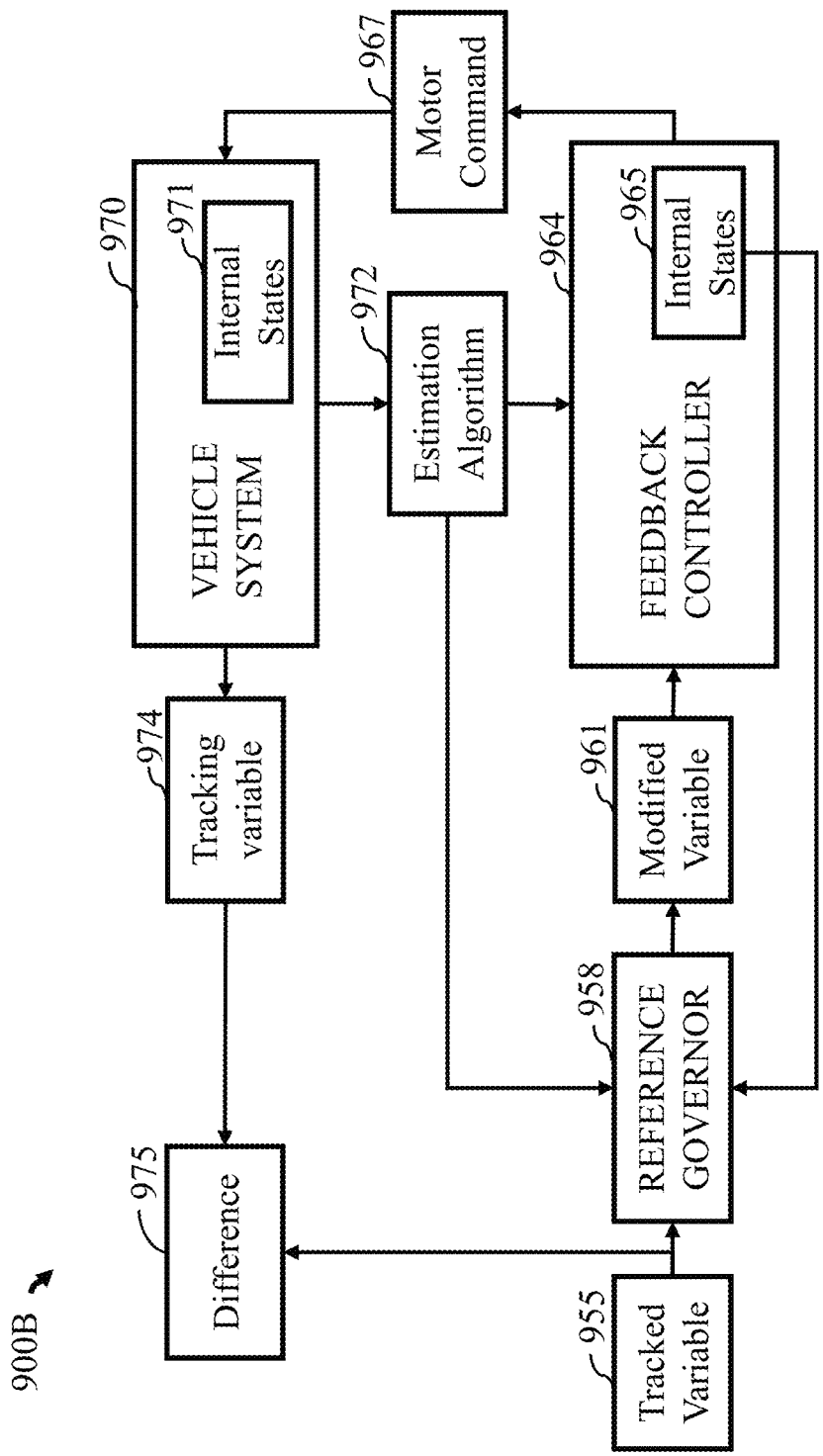

FIG. 9B shows an exemplar implementation of the operation of the tracking controller and the reference governor. Their operation is linked, as described in the following. The tracking controller 964 is designed with the recognition that the operation of the steering system can be modeled using a differential equation $$\dot{X}=f(X)+g(X)U \qquad (1)$$

where X represents the internal states 971 of the steering system and U is the motor command 967 to the actuator; internal states include and are not necessarily limited to the position of the steering wheel, the position of the vehicle wheels, and their rates of change. The heading of the vehicle or the tracking variable 974, i.e., the variable representing whichever quantity needs to track the desired variable 755, can be represented by the algebraic equation $$Y = h(X). \quad (2)$$

The motor command U is determined by the tracking controller 964 through the solution to another differential equation $$\dot{\tilde{X}} = \tilde{f}(\tilde{X}) + \tilde{g}_1(\tilde{X})\hat{X} + \tilde{g}_2(\tilde{X})R \quad (3)$$

where $\tilde{X}$ represents the internal states 965 of the controller, which do not necessarily represent any particular physical quantity; $\hat{X}$ represents the estimated values of the internal states X since typically internal states are not directly measured and must be estimated via an estimation algorithm 972; R represents the desired heading, or the desired value of whichever quantity is being tracked 955. The differential equation (3), along with the algebraic equation $$U = \tilde{h}(\tilde{X}) \quad (4)$$

is designed so that the value Y tracks the desired value R, that is, Y approaches R so that the difference 775 between the two stays small.

The system described by the equations (1) and (2) is constrained. For example, the vehicle wheels are physically constrained from rotating more than a certain amount. Other constraints on the system include constraints on the rates of change of the steering wheel or vehicle wheels however, in principle, the constraint could be anything on the internal states X and $\tilde{X}$ and the desired value R; mathematically the constraint can be described by a set-membership relation where the tuple (X, $\tilde{X}$, R) must remain in a constraint set C $$(X, \tilde{X}, R) \in C. \quad (5)$$

The reference governor 958 is designed to modify the value R from R to a modified value V 961, so as to ensure constraint adherence in (5). In one embodiment, if the tuple (X, $\tilde{X}$, R) does not satisfy the constraint, the reference governor chooses the closest V such that $$(\hat{X}, \tilde{X}, V) \in C \quad (6)$$

where $\hat{X}$ was used to signify that only the estimated state 972 may be available to the reference governor.

Figure 10:
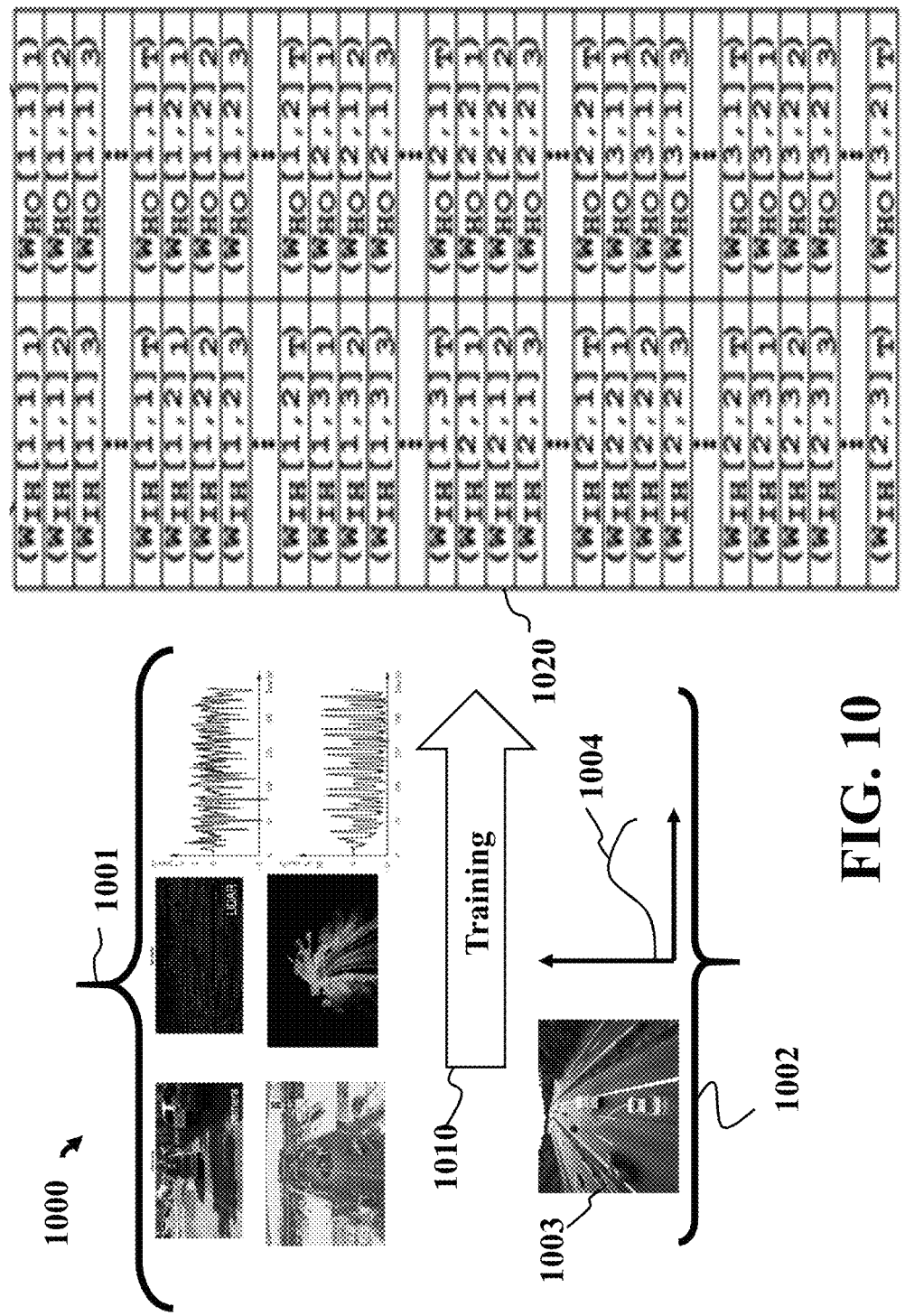
FIG. 10 shows a schematic of training a neural network, according to some embodiments of the present disclosure.

FIG. 10 shows a schematic of training a neural network according to some embodiments of the present disclosure. The training uses a training set of sequences of sensor inputs and corresponding heading, for example, behaviors, to produce the of the neural network behavior (for this example). In general, training a machine-learning algorithm comprises applying a training algorithm, sometimes referred to as a "learning" algorithm. A training set may include one or more sets of inputs and one or more sets of outputs with each set of inputs corresponding to a set of outputs. A set of outputs 1002 in a training set comprises a set of outputs that are desired, for example for a neural network, to generate when the corresponding set of inputs 1001 is inputted to the neural network.

For example, one embodiment trains a neural network. The training 1010 involves constructing a function using coefficients or components of functions 1020 that, when combined together in a way that has been obtained through learning, result in a function that maps a sequence of sensor data 1001 to a desired heading, such as turn left or turn right.

Another embodiment trains a neural network using rewards. The training 1010 involves mapping a sequence of sensor data 1001 to a future trajectory 1002 indicative of the heading of the vehicle, such as path 1003 of the vehicle using rewards 1004, where the rewards of the deep neural network have been defined in advance. The rewards can, for example, be selected based on a desired driving style and/or with respect to specification on the motion of the vehicle.

In some embodiments, the neural network consists of encoder and decoder networks in the form of recurrent neural networks for allowing dynamic temporal behavior of the resulting network. Various versions of recurrent neural networks, such as the long-term-short-term memory recurrent neural network, or the stacked recurrent neural network, can be utilized. A recurrent neural network can have several layers. Each layer can be a fully connected or convolutional.

The training data can include input time-series signals from the onboard sensors and the desired output vehicle trajectories, for example, but not necessarily, given as a sequence of Cartesian coordinates relative to the vehicle, or as a sequence of heading angles of the vehicle. In addition, the training data can include desired velocity profiles, for example given by a passenger of the vehicle, and the input data can be labeled according to the current driving style that is being trained. Several neural networks can be trained according to the number of preferred driving styles, and the corresponding labeled data tailors a neural network to every driving style.

For example, the operator or another user of the vehicle can choose the driving style to be used, or the operator can choose to let the vehicle decide the driving style that is suitable for the current user of the vehicle, which is then selected from the memory of the vehicle. The output trajectories can include velocity information or can be described without accompanying time information. The time-series signals are sent to the encoder network for computing the information indicative of the constraints on the motion of the vehicle. The information is then passed to the decoder network for generating an output trajectory matching the desired one. The mismatching between the generated trajectory and the desired trajectory provides a supervised signal for updating the neural network weights. The training can be achieved via an off-the-shelf feedforward neural network training algorithm such as the stochastic gradient descent with momentum algorithm. The decoder and encoder networks are trained together, because there is no output target for the encoder network and there is no input signal for the decoder network if the two networks are trained separately. Furthermore, the structure of the recurrent neural network ensures that the future trajectory can be learned by observing the past trajectory.

Training of the networks can also be done using simulated data that mimics different driving styles. With such an approach, although not perfectly matching real drivers, the training phase and the amount of data collection can be significantly decreased.

Features

Aspects of the control system can include the feedback controller can determine a value of a torque to reduce an error between the current heading of the vehicle and the desired heading of the vehicle, and commands a motor to rotate the wheels of the vehicle based on the determined torque. Wherein the desired heading can be modified by a constraint-enforcement algorithm, if the desired heading is determined to violate a prescribed constraint. Also, is possible for the reference governor to modify an amount of the desired heading, if one of the desired heading, the internal states of the vehicle system, the internal states of the feedback controller, or any combination thereof, result in causing a violation of prescribed constraints. Wherein the constraints are from the group consisting of a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels.

Further still, an aspect can include a memory to store a function that includes a mapping of historical steering angles to desired historical headings of the vehicle with a historical velocity of the vehicle. A convertor determines the desired heading of the vehicle using the function and a current measured velocity of the vehicle, wherein the current measured velocity of the vehicle is obtained from the vehicle data. Wherein the mapping varies based on a velocity of the vehicle.

Also, it is possible that the function can be a neural network trained to produce the desired heading of the vehicle based on the steering angle, the current heading of the vehicle, and an environment surrounding the vehicle. Further still, the function can include an inverse model of the steering system.

An aspect of the method can include the feedback controller determining a motor command based on the solution to a differential equation to reduce an error between the current heading of the vehicle and the desired heading of the vehicle, such that an amount of actuation by the motor command rotates a direction of the wheels of the vehicle steering system. Also, an aspect of the method can include the received signal being mapped to the desired heading of the vehicle based on a velocity of the vehicle.

Figure 11A:
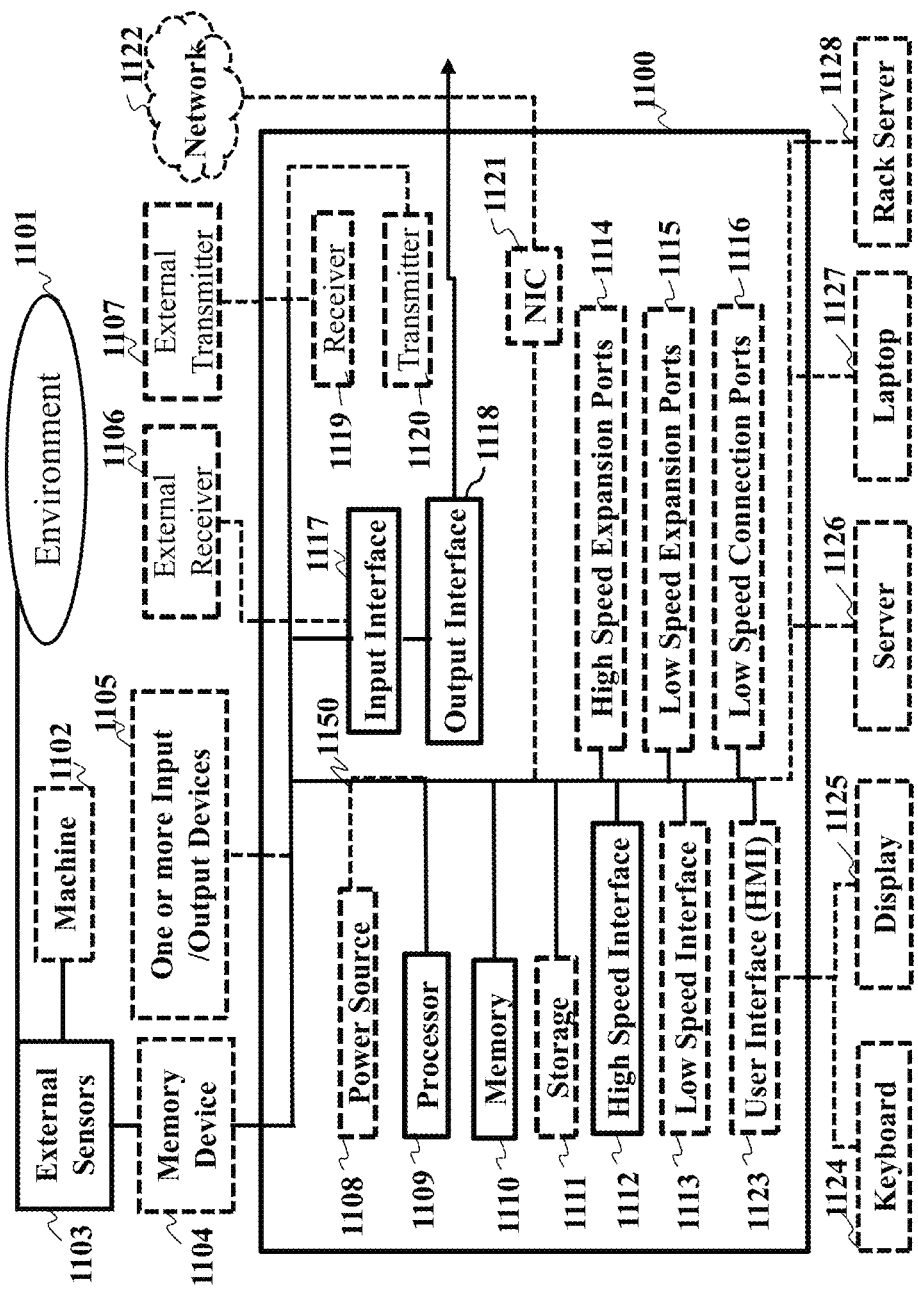
FIG. 11A is a schematic illustrating a computing apparatus that can be used to implement some techniques of the methods and systems, according to embodiments of the present disclosure.

FIG. 11A is a schematic illustrating by non-limiting example a computing apparatus 1100 that can be used to implement some techniques of the methods and systems, according to embodiments of the present disclosure. The computing apparatus or device 1100 represents various forms of digital computers, such as laptops, desktops, workstations, personal digital assistants, servers, blade servers, mainframes, and other appropriate computers.

The computing device 1100 can include a power source 1108, a processor 1109, a memory 1110, a storage device 1111, all connected to a bus 1150. Further, a high-speed interface 1112, a low-speed interface 1113, high-speed expansion ports 1114 and low speed connection ports 1115, can be connected to the bus 1150. Also, a low-speed expansion port 1116 is in connection with the bus 1150. Contemplated are various component configurations that may be mounted on a common motherboard depending upon the specific application. Further still, an input interface 1117 can be connected via bus 1150 to an external receiver 1106 and an output interface 1118. A receiver 1119 can be connected to an external transmitter 1107 and a transmitter 1120 via the bus 1150. Also connected to the bus 1150 can be an external memory 1104, external sensors 1103, machine(s) 1102 and an environment 1001. Further, one or more external input/output devices 1105 can be connected to the bus 1150. A network interface controller (NIC) 1121 can be adapted to connect through the bus 1150 to a network 1122, wherein data or other data, among other things, can be rendered on a third party display device, third party imaging device, and/or third party printing device outside of the computer device 1100.

Contemplated is that the memory 1110 can store instructions that are executable by the computer device 1100, historical data, and any data that can be utilized by the methods and systems of the present disclosure. The memory 1110 can include random access memory (RAM), read only memory (ROM), flash memory, or any other suitable memory systems. The memory 1110 can be a volatile memory unit or units, and/or a non-volatile memory unit or units. The memory 1110 may also be another form of computer-readable medium, such as a magnetic or optical disk.

Still referring to FIG. 11A, a storage device 1111 can be adapted to store supplementary data and/or software modules used by the computer device 1100. For example, the storage device 1111 can store historical data and other related data as mentioned above regarding the present disclosure. Additionally, or alternatively, the storage device 1111 can store historical data similar to data as mentioned above regarding the present disclosure. The storage device 1111 can include a hard drive, an optical drive, a thumb-drive, an array of drives, or any combinations thereof. Further, the storage device 1111 can contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1109), perform one or more methods, such as those described above.

The system can be linked through the bus 1150 optionally to a display interface or user Interface (HMI) 1123 adapted to connect the system to a display device 1125 and keyboard 1124, wherein the display device 1125 can include a computer monitor, camera, television, projector, or mobile device, among others.

Still referring to FIG. 11A, the computer device 1100 can include a user input interface 1117 adapted to a printer interface (not shown) can also be connected through bus 1150 and adapted to connect to a printing device (not shown), wherein the printing device can include a liquid inkjet printer, solid ink printer, large-scale commercial printer, thermal printer, UV printer, or dye-sublimation printer, among others.

The high-speed interface 1112 manages bandwidth-intensive operations for the computing device 1100, while the low-speed interface 1113 manages lower bandwidth-intensive operations. Such allocation of functions is an example only. In some implementations, the high-speed interface 1112 can be coupled to the memory 1110, a user interface (HMI) 1123, and to a keyboard 1124 and display 1125 (e.g., through a graphics processor or accelerator), and to the high-speed expansion ports 1114, which may accept various expansion cards (not shown) via bus 1150. In the implementation, the low-speed interface 1113 is coupled to the storage device 1111 and the low-speed expansion port 1115, via bus 1150. The low-speed expansion port 1115, which may include various communication ports (e.g., USB, Bluetooth, Ethernet, wireless Ethernet) may be coupled to one or more input/output devices 1105, and other devices a keyboard 1124, a pointing device (not shown), a scanner (not shown), or a networking device such as a switch or router, e.g., through a network adapter.

Still referring to FIG. 11A, the computing device 1100 may be implemented in a number of different forms, as shown in the figure. For example, it may be implemented as a standard server 1126, or multiple times in a group of such servers. In addition, it may be implemented in a personal computer such as a laptop computer 1127. It may also be implemented as part of a rack server system 1128. Alternatively, components from the computing device 1100 may be combined with other components in a mobile device (not shown), such as a mobile computing device 1199. Each of such devices may contain one or more of the computing device 1100 and the mobile computing device 1199, and an entire system may be made up of multiple computing devices communicating with each other.

The mobile computing device 1199 includes a bus 1195 connecting a processor 1161, a memory 1162, an input/output device 1163, a communication interface 1164, among other components. The bus 1195 can also be connected to a storage device 1165, such as a micro-drive or other device, to provide additional storage.

Referring to FIG. 11A, the processor 1161 can execute instructions within the mobile computing device 1199, including instructions stored in the memory 1162. The processor 1161 may be implemented as a chipset of chips that include separate and multiple analog and digital processors. The processor 1161 may provide, for example, for coordination of the other components of the mobile computing device 1199, such as control of user interfaces, applications run by the mobile computing device 1199, and wireless communication by the mobile computing device 1199.

The processor 1161 may communicate with a user through a control interface 1166 and a display interface 1167 coupled to the display 1168. The display 1168 may be, for example, a TFT (Thin-Film-Transistor Liquid Crystal Display) display or an OLED (Organic Light Emitting Diode) display, or other appropriate display technology. The display interface 1167 may comprise appropriate circuitry for driving the display 1168 to present graphical and other information to a user. The control interface 1066 may receive commands from a user and convert them for submission to the processor 1161. In addition, an external interface 1169 may provide communication with the processor 1161, so as to enable near area communication of the mobile computing device 1199 with other devices. The external interface 1169 may provide, for example, for wired communication in some implementations, or for wireless communication in other implementations, and multiple interfaces may also be used.

Still referring to FIG. 11A, the memory 1162 stores information within the mobile computing device 1199. The memory 1162 can be implemented as one or more of a computer-readable medium or media, a volatile memory unit or units, or a non-volatile memory unit or units. An expansion memory 1170 may also be provided and connected to the mobile computing device 1199 through an expansion interface 1169, which may include, for example, a SIMM (single in line memory module) card interface. The expansion memory 1170 may provide extra storage space for the mobile computing device 1199, or may also store applications or other information for the mobile computing device 1199. Specifically, the expansion memory 1170 may include instructions to carry out or supplement the processes described above, and may include secure information also. Thus, for example, the expansion memory 1170 may be providing as a security module for the mobile computing device 1199, and may be programmed with instructions that permit secure use of the mobile computing device 1199. In addition, secure applications may be provided via the SIMM cards, along with additional information, such as placing identifying information on the SIMM card in a non-hackable manner.

The memory 1162 may include, for example, flash memory and/or NVRAM memory (non-volatile random access memory), as discussed below. In some implementations, instructions are stored in an information carrier, that the instructions, when executed by one or more processing devices (for example, processor 1199), perform one or more methods, such as those described above. The instructions can also be stored by one or more storage devices, such as one or more computer or machine readable mediums (for example, the memory 1162, the expansion memory 1170, or memory on the processor 1162). In some implementations, the instructions can be received in a propagated signal, for example, over the transceiver 1171 or the external interface 1169.

Figure 11B:
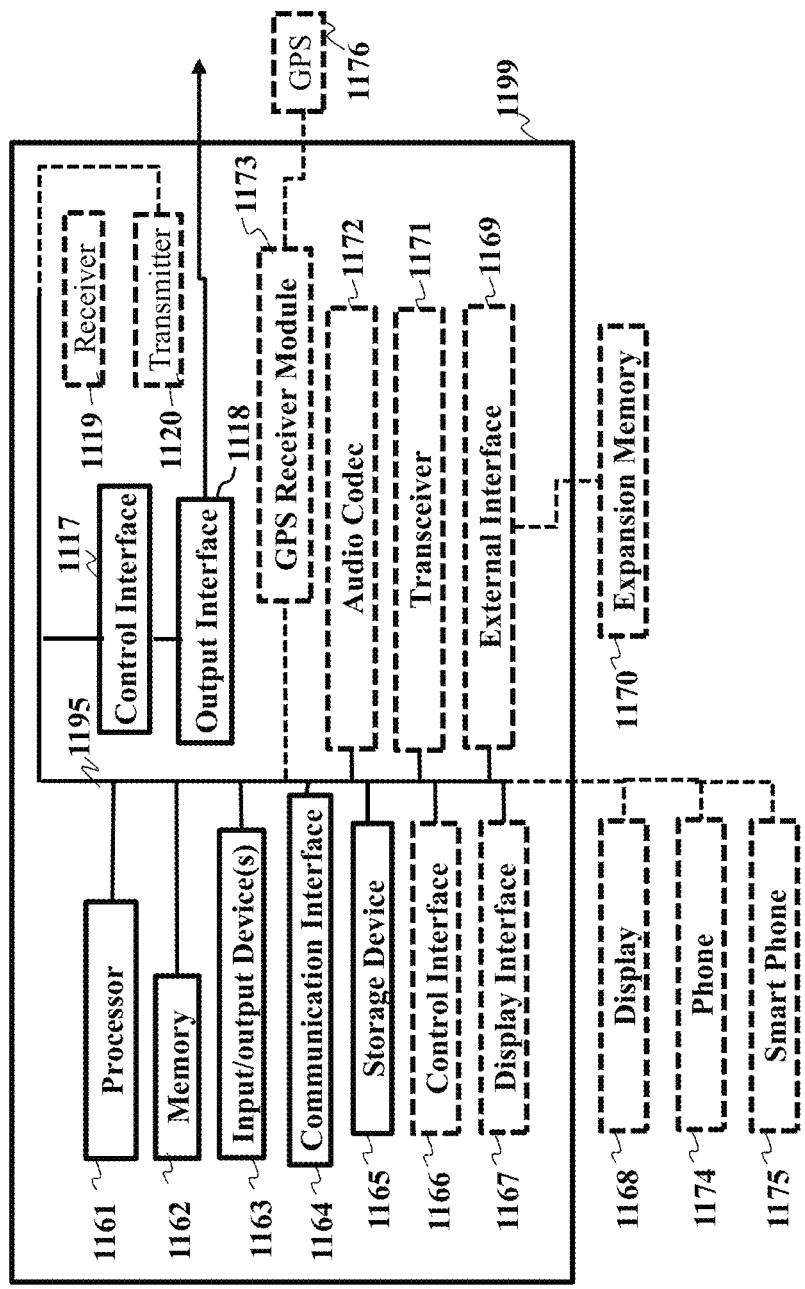
FIG. 11B is a schematic illustrating a mobile computing apparatus that can be used to implement some techniques of the methods and systems, according to embodiments of the present disclosure.

FIG. 11B is a schematic illustrating a mobile computing apparatus that can be used to implement some techniques of the methods and systems, according to embodiments of the present disclosure. The mobile computing apparatus or device 1199 is intended to represent various forms of mobile devices, such as personal digital assistants, cellular telephones, smart-phones, and other similar computing devices. The mobile computing device 1199 may communicate wirelessly through the communication interface 1164, which may include digital signal processing circuitry where necessary. The communication interface 1164 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1171 using a radio-frequency. In addition, short-range communication may occur, such as using a Bluetooth, WiFi, or other such transceiver (not shown). In addition, a GPS (Global Positioning System) receiver module 1173 may provide additional navigation and location related wireless data to the mobile computing device 1199, which may be used as appropriate by applications running on the mobile computing device 1199.

The mobile computing device 1199 may also communicate audibly using an audio codec 1172, which may receive spoken information from a user and convert it to usable digital information. The audio codec 1172 may likewise generate audible sound for a user, such as through a speaker, e.g., in a handset of the mobile computing device 1199. Such sound may include sound from voice telephone calls, may include recorded sound (e.g., voice messages, music files, etc.) and may also include sound generated by applications operating on the mobile computing device 1199.

Still referring to FIG. 11B, the mobile computing device 1199 may be implemented in a number of different forms, as shown in the figure. For example, it may be implemented as a cellular telephone 1174. It may also be implemented as part of a smart-phone 1175, personal digital assistant, or other similar mobile device.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A control system for controlling a machine which is a dynamical system subject to stability and feasibility requirements, comprising:
   a first controller accepts input data via sensors associated with the machine operated by an operator, the first controller is to generate a first control command, wherein the accepted input data includes data associated with an objective of the operator to control the machine, such that the generated first control command is according to the objective of the operator to control the machine;
   a second controller to generate a control input as a combination of a second control command and a third control command; and
   a motor to control the machine according to the control input, wherein the second controller is configured to generate the second control command according to the same objective of the operator to control the machine, and generates the third control command using a product of a gain with a difference between the first control command and the second control command.

2. The control system of claim 1, wherein the first control command and the second control command specify values for the same physical quantities of the machine achieving the same objective of the operator to control the machine.

3. The control system of claim 1, wherein the second controller is configured to generate the second command subject to a constraint set determined by the designer of the controller, such that the values for the same physical quantities generated by the first and the second controller are the same when the first controller does not violate the constraint, and are different when the first controller violates the constraint.

4. The control system of claim 1, wherein the first controller and the second controller are configured to receive a reference trajectory and the objective of the operator to control the machine is to change the state of the machine to follow the reference trajectory.

5. The control system of claim 1, wherein the gain is selected to guarantee asymptotic stability of the control system.

6. The control system of claim 5, wherein the gain is tuned to satisfy a stability criteria including one or combination of sign of Eigenvalues of the control system, existence of Lyapunov function for the control system, satisfaction of Bode criteria, and satisfaction of Nyquist criteria.

7. The control system of claim 5, wherein the gain is determined according to a solution of a stability function.

8. The control system of claim 7, wherein the stability function includes one or combination of Riccati equation and a control Lyapunov function.

9. The control system of claim 1, wherein the first controller is configured to generate the first control command according to the objective of the operator to control the machine, and wherein the second controller is configured to generate the second control command according to an estimation of the same objective of the operator to control the machine.

10. The control system of claim 9, wherein the machine is a vehicle for being operated by the operator that provides the inputs to the first controller to generate the first control command.

11. A control system for controlling a machine which is a dynamical system subject to stability and feasibility requirements, comprising:
    a first controller accepts input data via sensors associated with the machine operated by an operator, the first controller is to generate a first control command, wherein the accepted input data includes data associated with an objective of the operator to control the machine, such that the generated first control command is according to the objective of the operator to control the machine;
    a second controller to generate a control input as a combination of a second control command and a third control command; and
    a motor to control the machine according to the control input, wherein the second controller is configured to generate the second control command according to an estimation of the same objective of the operator to control the machine, and generates the third control command using a product of a gain with a difference between the first and the second control commands.

12. The control system of claim 11, further comprising:
    a receiver to receive the input data that includes a signal indicative of an applied torque input to a steering wheel of a vehicle, such that the machine is the vehicle;
    a mapper to map the received signal to a desired heading of the vehicle based on internal states of the vehicle;
    a sensor of the sensors to obtain vehicle data including a measure of a current heading of the vehicle; and
    a feedback controller to control movement of the vehicle causing the current heading of the vehicle to track the desired heading of the vehicle.

13. The control system of claim 12, wherein the feedback controller is configured to determine a value of a torque to reduce an error between the current heading of the vehicle and the desired heading of the vehicle, and commands the motor to rotate the wheels of the vehicle based on the determined torque.

14. The control system of claim 12, wherein the desired heading is modified by a constraint-enforcement algorithm, if the desired heading is determined to violate a prescribed constraint.

15. The control system of claim 12, wherein the reference governor is configured to modify an amount of the desired heading, if one of the desired heading, the internal states of the vehicle system, the internal states of the feedback controller, or any combination thereof, will result in causing a violation of prescribed constraints.

16. The control system of claim 15, wherein the prescribed constraints are from the group consisting of a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels.

17. The control system of claim 12, further comprising:
a memory to store a function that includes a mapping of historical steering angles to desired historical headings of the vehicle with a historical velocity of the vehicle, such that the mapping varies based on a velocity of the vehicle;
a convertor is configured to determine the desired heading of the vehicle using the function and a current measured velocity of the vehicle, such that the function is a neural network trained to produce the desired heading of the vehicle based on the steering angle, the current heading of the vehicle, and an environment surrounding the vehicle, wherein the current measured velocity of the vehicle is obtained from the vehicle data.

18. The control system of claim 11, wherein the gain is selected to guarantee asymptotic stability of the control system, such that the gain is determined according to a solution of a stability function, wherein the stability function includes one or combination of Riccati equation and a control Lyapunov function.

19. A method for controlling a movement of a vehicle which is a dynamical system subject to stability and feasibility requirements, wherein the method uses a processor coupled with stored instructions implementing the method, such that the instructions, when executed by the processor carry out at least some steps of the method, comprising:
receiving input data via sensors associated with the vehicle operated by an operator, such that the input data includes a signal indicative of a steering angle of a steering wheel of the vehicle;
mapping the received signal to a desired heading of the vehicle using a mapper based on internal states of the vehicle;
receiving vehicle data via a sensor of the sensors, such that the vehicle data includes a measure of a current heading of the vehicle;
controlling the movement of the vehicle using a replicate controller, for causing the current heading of the vehicle to track the desired heading of the vehicle, wherein the replicate controller generates a control input as a combination of a first replicate control command and a second replicate control command, wherein the replicate controller generates the first replicate control command according to the desired heading of the vehicle, and generates the second replicate control command using a product of a gain with a difference between a nominal control command and the first replicate control command, wherein the nominal control command is generated by a nominal controller based on an input from the operator of the vehicle, wherein the desired heading of the vehicle for the nominal controller and the replicate controller are the same.

20. The method of claim 19, wherein the first control command and the second control command specify values for the same physical quantities of the machine achieving the same objective of the operator to control the machine.

* * * * *